United States Patent [19]
Barbe et al.

[11] Patent Number: 4,781,204
[45] Date of Patent: Nov. 1, 1988

[54] APPARATUS FOR MANIPULATING ROD-SHAPED ARTICLES OF THE TOBACCO PROCESSING INDUSTRY

[75] Inventors: Karl-Heinz Barbe, Hamburg; Werner Hinz, Lauenburg; Jörg Ziolkowski, Tespe, all of Fed. Rep. of Germany

[73] Assignee: Körber AG, Hamburg, Fed. Rep. of Germany

[21] Appl. No.: 27,486

[22] Filed: Mar. 18, 1987

[30] Foreign Application Priority Data

Mar. 26, 1986 [DE] Fed. Rep. of Germany ....... 3610209

[51] Int. Cl.⁴ .............................................. A24C 5/60
[52] U.S. Cl. .................................... 131/282; 131/281; 131/27.1; 131/28
[58] Field of Search .............. 131/280, 281, 282, 27.1, 131/28

[56] References Cited

U.S. PATENT DOCUMENTS

| | | | |
|---|---|---|---|
| 4,249,545 | 2/1981 | Gretz et al. | 131/281 |
| 4,277,678 | 7/1981 | Wahle et al. | 131/282 |
| 4,281,670 | 8/1981 | Heitmann et al. | 131/281 |

*Primary Examiner*—Vincent Millin
*Attorney, Agent, or Firm*—Peter K. Kontler

[57] ABSTRACT

Filter cigarettes which are transported sideways at the periphery of a rotating drum-shaped conveyor are engaged by successive rolling surfaces of a pair of coaxial rotary rolling members which rotate at the peripheral speed of the conveyor but in the opposite direction so that the cigarettes are caused to roll about their respective axes and cease to advance with the conveyor. The periphery of the conveyor is formed with flutes which receive the freshly rolled cigarettes, and the rolling of cigarettes is abruptly terminated by arresting members which orbit adjacent the path of movement of the cigarettes at the peripheral speed of the conveyor and in the same direction. A laser is used to make holes in successive cigarettes while the cigarettes roll about their respective axes.

20 Claims, 8 Drawing Sheets

APPARATUS FOR MANIPULATING ROD-SHAPED ARTICLES OF THE TOBACCO PROCESSING INDUSTRY

BACKGROUND OF THE INVENTION

The invention relates to apparatus for manipulating rod-shaped articles, especially rod-shaped articles of the tobacco processing industry. More particularly, the invention relates to improvements in apparatus for rolling rod-shaped articles between moving surfaces so that the articles turn about their respective axes. Such movements of articles are necessary in several types of cigarette making and like machines, for example, to convolute uniting bands around groups of coaxial rod-shaped components to form filter cigarettes of double unit length, to rotate finished filter cigarettes for the purpose of providing their wrappers with perforations for entry of atmospheric air and/or for the purpose of testing the wrappers for the presence of holes, open seams and/or other defects.

It is already known to roll cigarettes and like rod-shaped articles of the tobacco processing industry about their respective axes by advancing the cigarettes in the axially parallel flutes of a rotary drum-shaped conveyor past a cylindrical rolling member which is sufficiently close to the periphery of the conveyor to engage the oncoming cigarettes and to dislodge the engaged cigarettes from their flutes. The cigarettes roll about their respective axes and thus cease to advance with the conveyor, i.e., the conveyor moves relative to the rolling cigarette and advances an oncoming flute into register with such cigarette. The flute communicates with the intake ends of suction ports which enable a suction generating device to attract the freshly rolled cigarette in the adjacent flute. Reference may be had to commonly owned U.S. Pats. Nos. 4,249,545 to Gretz et al. and 4,281,670 to Heitmann et al. which disclose apparatus for making holes in rotating rod-shaped articles by means of one or more beams of coherent radiation, and to commonly owned U.S. Pat. No. 4,277,678 to Wahle et al. which discloses apparatus for optoelectronic testing of the wrappers of rod-shaped articles. The disclosures of these patents are incorporated herein by reference.

A modern cigarette maker turns out very large numbers of articles per unit of time. The apparatus for rotating the articles about their respective axes must be designed with a view to predictably start and terminate the rolling operation and to thus ensure that the articles which have advanced beyond the rolling station are in optimum positions for further treatment, e.g., for transfer onto a different conveyor. This necessitates an abrupt termination of rolling as soon as the articles reach the oncoming flutes because, otherwise, the articles would roll beyond such flutes and could not be properly advanced to the locus of removal from the conveyor and/or to a further processing station. As a rule, presently known apparatus for rolling rod-shaped articles of the tobacco processing industry employ suction generating devices which draw air from the flutes for freshly rolled articles in order to abruptly terminate the rolling step and to maintain the articles in optimum positions for further transport and processing. This necessitates the establishment of a pronounced pressure differential and the provision of a large number of large-diameter suction ports which can lead to deformation of the wrappers and to the generation of pronounced noise.

OBJECTS AND SUMMARY OF THE INVENTION

An object of the invention is to provide a novel and improved apparatus for manipulating rod-shaped articles, especially rod-shaped articles of the tobacco processing industry, in such a way that the rolling of articles can be terminated abruptly, with a high degree of predictability and by resorting to simple, compact and inexpensive instrumentalities.

Another object of the invention is to provide an apparatus which can be installed in existing production lines for the making of filter cigarettes or other rod-shaped articles of the tobacco processing industry to ensure a highly predictable manipulation of articles on their way toward as well as at the rolling station.

A further object of the invention is to provide the apparatus with novel and improved means for reliably terminating the rolling of articles in optimum positions for further transport by the conveyor.

An additional object of the invention is to provide the apparatus with novel and improved means for synchronizing the movements of its mobile components.

Still another object of the invention is to provide the apparatus with novel and improved means for initiating the rolling of successive rod-shaped articles.

An additional object of the invention is to provide a novel and improved method of manipulating rod-shaped articles of the tobacco processing industry during their transport toward, through and past the rolling station.

A further object of the invention is to provide a method of treating the articles gently and in such a way that the rolling operation does not involve the generation of excessive noise.

An additional object of the invention is to provide a novel and improved method of moving rod-shaped articles of the tobacco processing industry during the making of perforations in their wrappers and/or during testing of their wrappers for the presence of holes, open seams, the density of tobacco at the ends, frayed ends and/or other defects.

One feature of the present invention resides in the provision of an apparatus for manipulating filter cigarettes and/or other rod-shaped articles of the tobacco processing industry. The apparatus comprises a conveyor which serves to move the articles in a predetermined direction and has a series of first rolling surfaces each including a front portion and a rear portion (as seen in the predetermined direction), a rolling device which includes at least one rolling member having a series of second rolling surfaces, first drive means for moving the first surfaces at a predetermined speed, means for depositing articles on the first portions of successive first surfaces, and second drive means for moving the second surfaces at the predetermined speed but counter to the predetermined direction. The rolling member is adjacent the conveyor so that the articles which advance with the front portions of successive first surfaces are engaged by successive second surfaces and roll about their own axes while the respective first surfaces advance relative thereto. The apparatus further comprises means for terminating the rolling of articles when the articles are reached by the rear portions of the respective first surfaces. The means for terminating comprises a series of spaced-apart arresting members and means for moving the arresting members in the predetermined direction and at the predetermined speed so that successive arresting members engage successive articles on the conveyor and press the articles against the rear portions of the respective first surfaces.

The front and/or rear portions of the first surfaces are preferably provided with elongated flutes or analogous article receiving means which extend transversely of the predetermined direction.

The conveyor can include a rotary drum-shaped member whose peripheral surface has a plurality of circumferentially spaced-apart sections which constitute the first surfaces. The conveyor can further comprise means for attracting the articles to the front and/or rear portions of the first surfaces by suction; such attracting means can comprise suction ports whose intake ends are disposed in the respective flutes.

The rolling member can comprise a rotor whose peripheral surface includes circumferentially spaced-apart sections which constitute the second surfaces. The means for terminating the rolling of articles can also include a rotor and the arresting members can constitute or include projections which extend outwardly beyond the periphery of the rotor. The rolling device can include two spaced-apart coaxial rotors and the rotor of the means for terminating rotation of the articles can be disposed between the rotors of the rolling device.

The second drive means can comprise a shaft and the means for terminating the rolling of articles can be rotatably mounted on such shaft.

The apparatus can comprise means for transmitting motion from the second drive means to the means for moving the arresting members, and such motion transmitting means can comprise a train of spur gears or a train of bevel gears. Alternatively, the second drive means can comprise at least one first shaft and the means for moving the arresting members can comprise a second shaft; one of these shafts is hollow and the other shaft is rotatably received in the hollow shaft.

Each rolling member can comprise an article entraining element at the front end of each second surface.

The first and second surfaces are preferably convex, and the curvature of the first surfaces can deviate from that of the second surfaces. The conveyor can comprise ribs which are disposed between the rear portions of the first surfaces and the front portions of neighboring first surfaces. The rotor or rotors of the rolling device can be coaxial with the rotor of the means for terminating the rolling of the articles.

The apparatus can comprise a laser or other suitable means for making holes in selected portions of the articles while the articles roll between the respective first and second surfaces. If the conveyor is a rotary drum-shaped conveyor, its axis is preferably parallel to the axes of rotors of the rolling device and of the means for terminating the rolling of articles. The aforementioned article entraining members of the rolling member or members can be said to constitute a means for expelling articles from the front portions of the first surfaces immediately prior to engagement of the thus expelled articles by the respective second surfaces.

Another feature of the invention resides in the provision of a method of manipulating rod-shaped articles of the tobacco processing industry between a succession of first surfaces, each of which has a front or leading portion and a rear or trailing portion, and a succession of second surfaces. The method comprises the steps of advancing the first surfaces in a predetermined direction and at a predetermined speed along a first path wherein the front portions of the first surfaces are located ahead of the respective rear portions, depositing articles on or in the front portions of successive first surfaces so that the articles extend transversely of the predetermined direction, advancing the second surfaces at the predetermined speed but in a second direction counter to the first direction along a second path at least a portion of which is sufficiently close to the first path to move the second surfaces into contact with the oncoming articles so that successive articles are compelled to rotate about their respective axes and the first surfaces advance in the predetermined direction relative to the rotating articles (i.e., the rear portions of the first surfaces approach the respective articles while the articles rotate about their axes as a result of simultaneous engagement by a first and a second surface and the articles do not move in either direction because the first and second surfaces move in opposite directions while advancing at the same speed), and terminating the rotation of articles about their respective axes when the articles are contacted by the oncoming trailing or rear portions of the respective first surfaces. The terminating step includes mechanically pressing the articles against the rear portions of the respective first surfaces. Such mechanical pressing is resorted to in addition to the possibility of attracting the articles to the rear portions of the respective first surfaces by suction.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
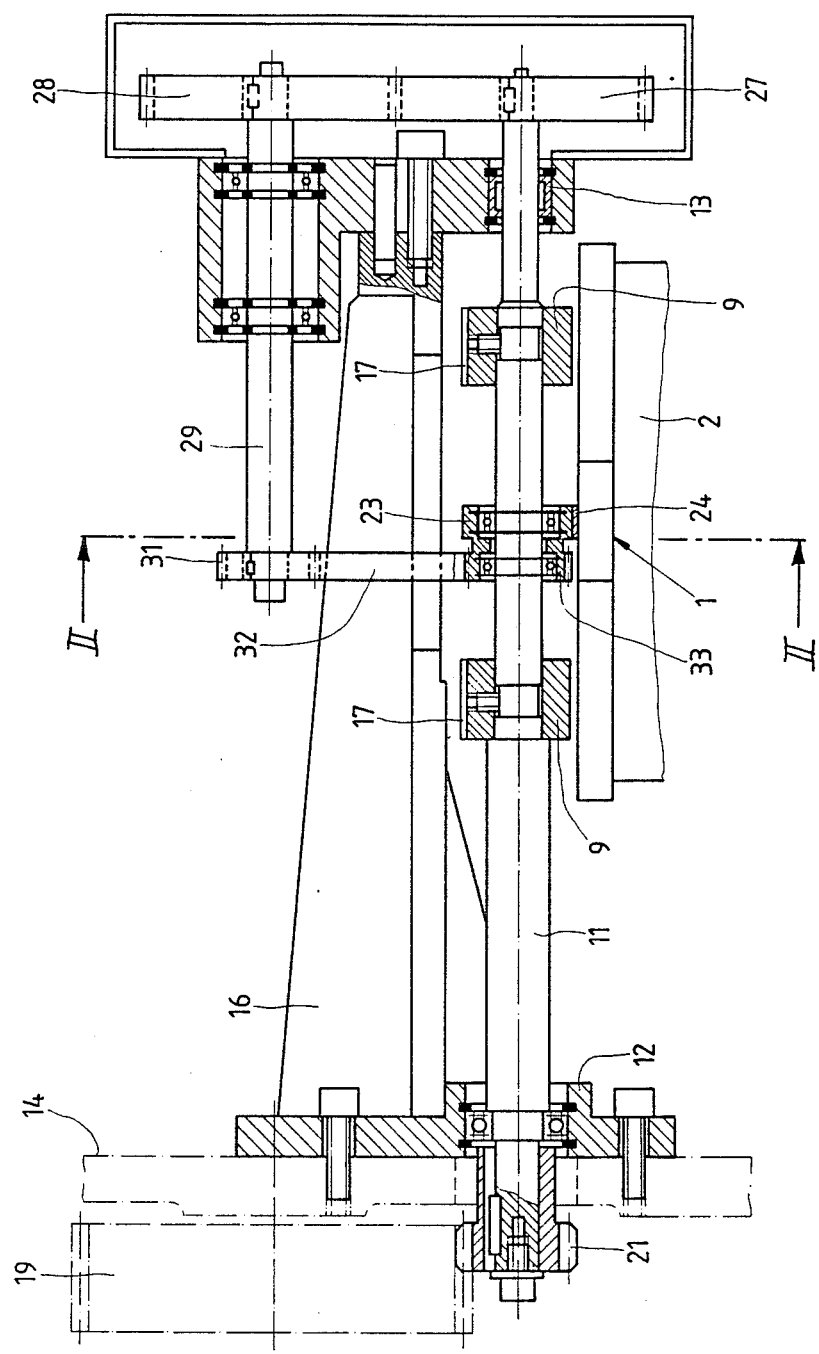
FIG. 1 is a fragmentary side elevational view of an apparatus which embodies one form of the invention and is installed in a filter tipping machine, certain parts of the apparatus being shown in section.
Figure 2:
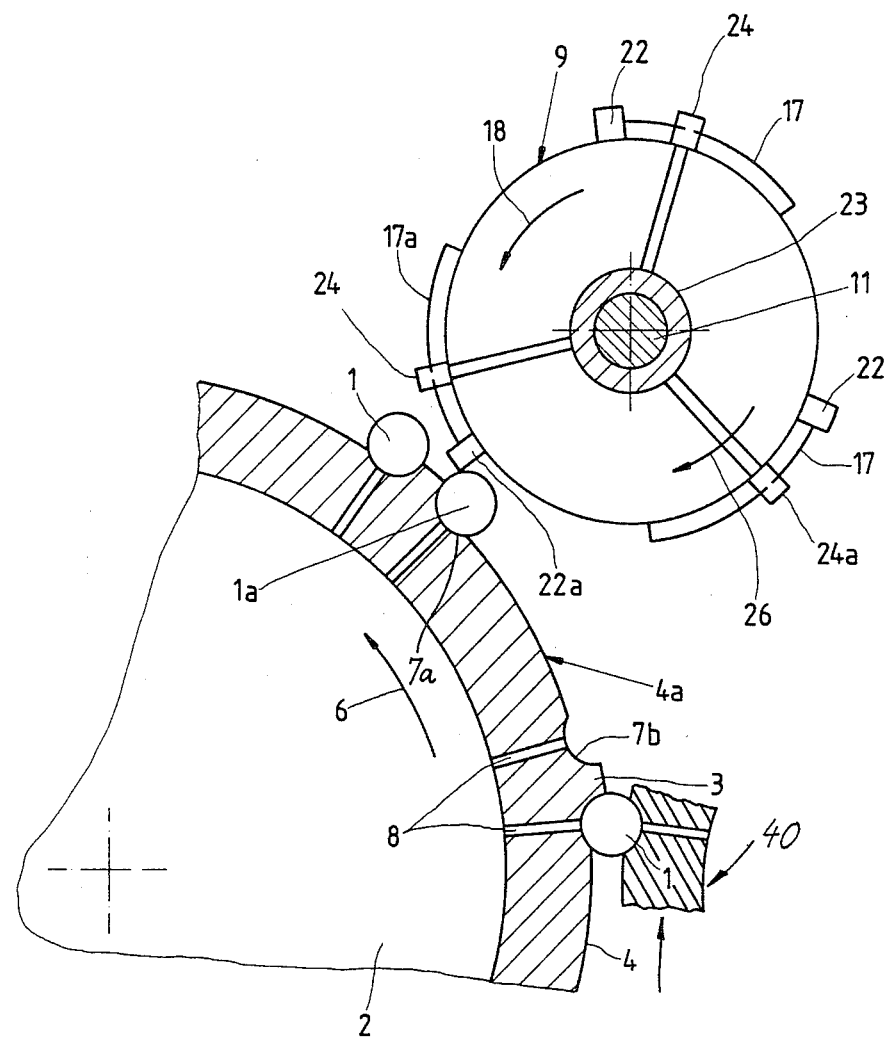
FIG. 2 is an enlarged fragmentary transverse sectional view as seen in the direction of arrows from the line II—II of FIG. 1, one of the articles being shown on the front portion of the respective first surface.
Figure 3:
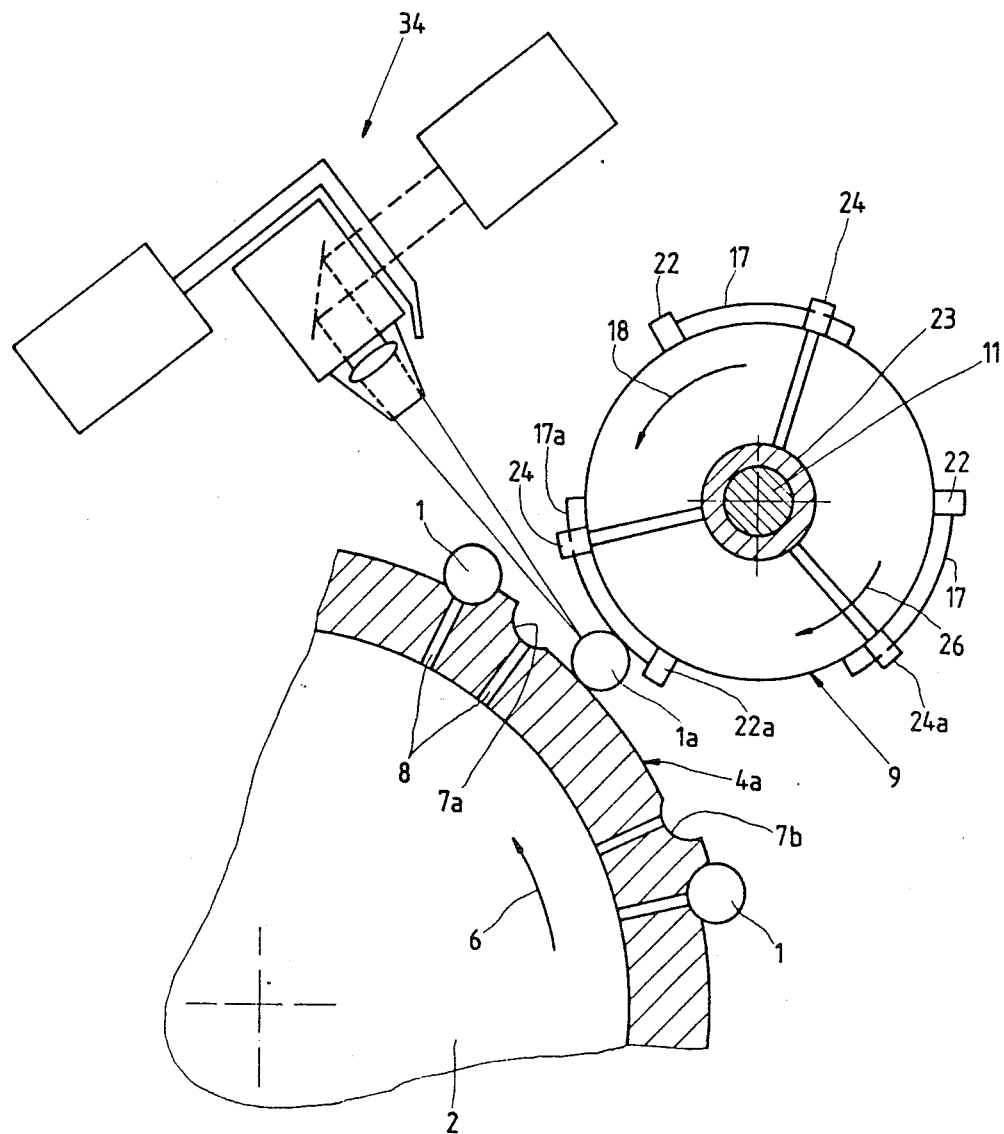
FIG. 3 illustrates the structure of FIG. 2 in different angular positions of the conveyor and a rolling member relative to each other, and further showing a device for making holes in the article which is being rolled by a first and an adjacent second surface.
Figure 4:
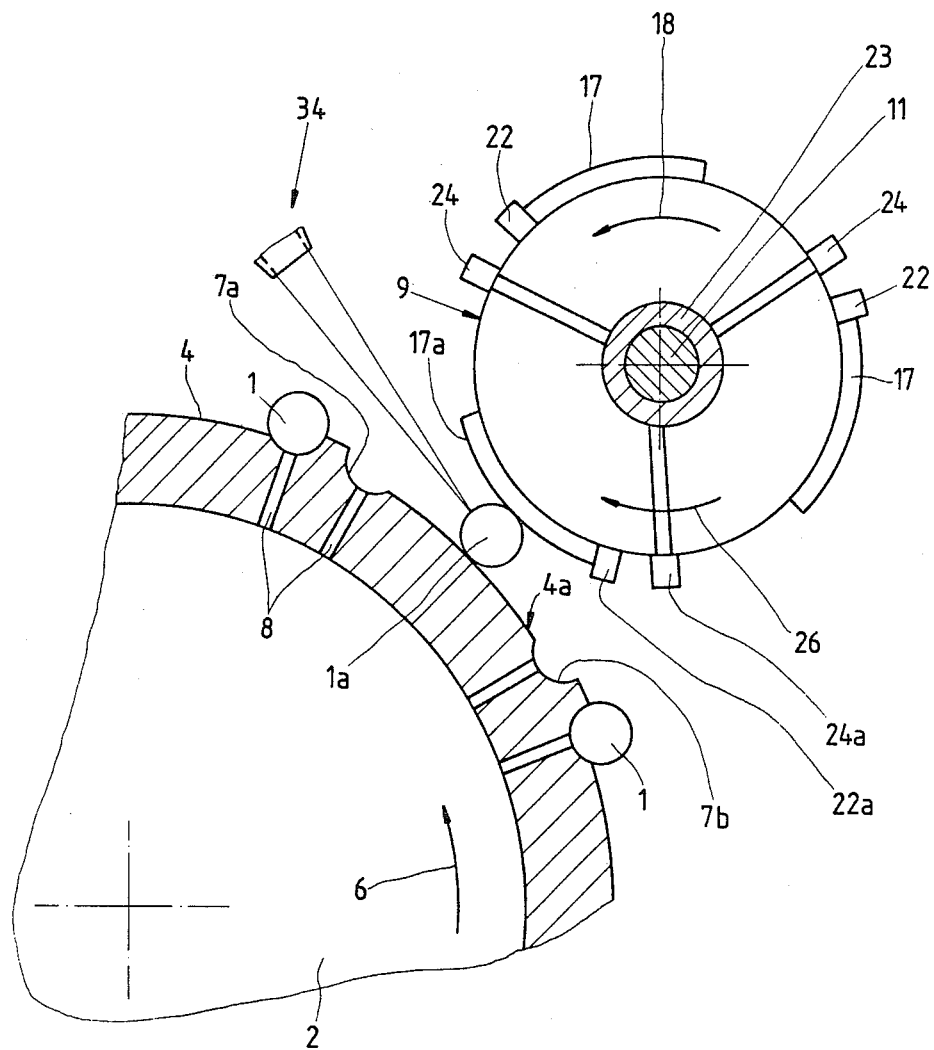
FIG. 4 illustrates the structure of FIG. 3 but with the conveyor and the one rolling member in different angular positions relative to each other.
Figure 5:
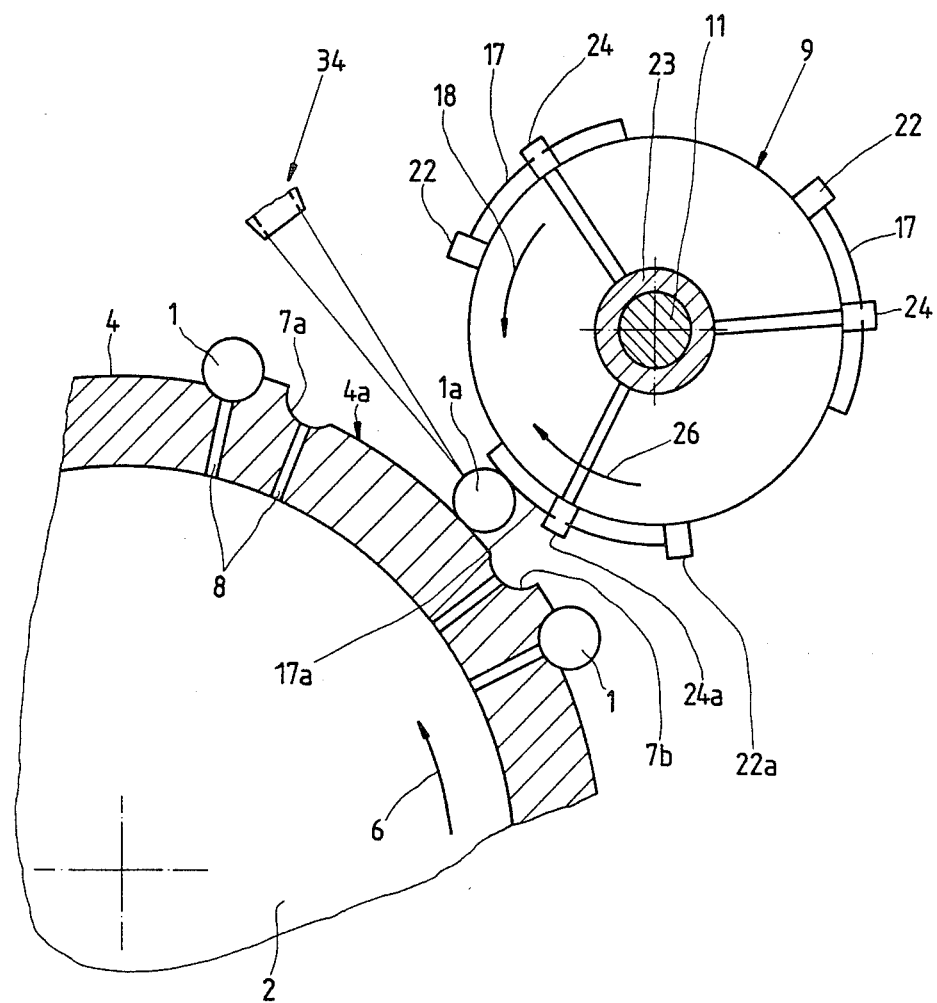
FIG. 5 shows the structure of FIG. 4 but in different angular positions of the conveyor and one rolling member relative to each other.

Referring first to FIGS. 1 and 2, there is shown an apparatus which serves to roll rod-shaped articles 1 about their respective axes while the articles are caused to interrupt their advancement with a rotary drum-shaped conveyor 2. The articles 1 are filter cigarettes of double unit length each of which has two plain cigarettes of unit length, a filter rod section of double unit length between the plain cigarettes, and a uniting band which is rolled around the filter rod section and around the adjacent end portions of the plain cigarettes in a manner well known from the art of making filter cigarettes. Reference may be had to the aforementioned U.S. Pats. to Gretz et al., Heitmann et al. and Wahle et al. which disclose filter cigarette making machines of the type known as MAX (manufactured by the assignee of the present application). The peripheral surface of the conveyor 2 has axially parallel projections in the form of ribs 3 which divide the peripheral surface into a series of convex rolling surfaces 4 (first rolling surfaces) each having a front or first portion provided with a first axially parallel article receiving flute 7a (note FIG. 3) immediately behind a rib 3 and a rear or second portion provided with a second axially parallel article receiving flute 7b immediately in front of the next-following rib 3. The direction in which the conveyor 2 is driven by a first drive means (refer to the patents to Gretz et al., Heitmann et al. and Wahle et al.) is indicated by the arrow 6. The body of the conveyor 2 is formed with rows of suction ports 8 whose intake ends communicate with the flutes 7a and 7b so that the articles 1 are attracted when they are deposited on the respective surfaces 4 and also when the advancement of such surfaces relative to the respective articles 1 is completed. In other words, each article 1 is deposited into a flute 7a immediately behind a rib 3 and ultimately lands in the immediately following flute 7b in front of the next-following rib 3. This can be seen by comparing the positions of the article 1a in FIGS. 2 and 6.

The means for depositing articles 1 into successive flutes 7a comprises a rotary drum-shaped conveyor 40.

The conveyor 2 cooperates with a rolling device having two coaxial rotor-like rolling members 9 which are spaced apart from one another in the axial direction of the conveyor 2 and have sets of three convex rolling surfaces 17 forming part of a composite peripheral surface. The rolling members 9 are driven in the direction of arrow 18, i.e., counter to the direction of rotation of the conveyor 2, but at the same peripheral speed. Thus, the speed of rolling surfaces 4 at the periphery of the conveyor 2 matches the speed of rolling surfaces 17 at the peripheries of the rolling members 9. The drive means for the rolling members 9 comprises a shaft 11 whose axis is parallel to the axis of the conveyor 2 and which is journalled in two antifriction bearings 12, 13 carried by a supporting beam 16 which is affixed to the housing 14 of the filter tipping machine. The minimum distance between the path of the surfaces 4 and the path of the surfaces 17 is slightly less than the diameter of an article 1 so that an article is compelled to rotate about its axis when it reaches the rolling station substantially at the two o'clock position of the conveyor 2 (as seen in FIG. 2).

The front portions of the surfaces 17 on the rolling members 9 are provided with radially outwardly extending entraining members 22 in the form of projections which serve to expel the articles 1 from the respective front flutes 7a preparatory to engagement of the expelled articles by the respective convex surfaces 17 on the two rolling members 9.

The drive means for the rolling members 9 comprises the aforementioned shaft 11, a driver gear 19 which receives motion from the main prime mover of the filter tipping machine, and a driven gear 21 which is in mesh with the gear 19 and is mounted on the shaft 11. The prime mover also drives the shaft for the conveyor 2 at the aforementioned speed, i.e., in such a way that the speed of the surfaces 4 matches that of the surfaces 17.

In accordance with a feature of the invention, the apparatus further comprises means for terminating the rolling of articles 1 as soon as they reach and enter the respective rear flutes 7b. The means for terminating the rolling of articles comprises a rotor 23 which is coaxial with and is disposed between the rolling members 9 and has a set of three circumferentially spaced-apart arresting members 24 extending radially beyond the periphery of the rotor 23. The rotor 23 is rotatable on two antifriction bearings which surround the shaft 11 of the drive means for the rolling members 9. FIGS. 2-6 show the rotor 23 on a smaller scale so as to expose the respective rolling member 9. The direction in which the rotor 23 is rotated by a third drive is indicated by the arrow 26, i.e., the rotor 23 is driven to rotate in the direction of rotation (arrow 6) of the conveyor 2 and at such a speed that the speed of the arresting members 24 matches the peripheral speed of the conveyor. When an arresting member 24 advances along the rolling station, its speed not only matches the peripheral speed of the conveyor 2 but such arresting member also advances in the direction of travel of the adjacent surface 4 and its flutes 7a, 7b.

The drive for the rotor 23 comprises a toothed pulley 33 on the rotor and means for transmitting motion from the shaft 11 to the pulley 33. The motion transmitting means comprises a train of spur gears 27, 28, an intermediate shaft 29 which is parallel with the shaft 11, and an endless belt transmission including a toothed pulley 31 on the shaft 29 and an endless toothed belt 32 which is trained over the pulleys 31, 33. The shaft 29 is rotatable in the supporting beam 16, and the gear 27 is mounted on the shaft 11.

The purpose of the apparatus which is shown in FIGS. 1 to 6 is to rotate the articles 1 about their respective axes in order to enable a laser 34 (note FIG. 3) to make in the wrappers of the articles 1 annuli of perforations for admission of atmospheric air into the column of tobacco smoke which flows toward the mouth of the smoker when a filter cigarette forming one-half of an article 1 is lighted. The manner in which the wrappers of filter cigarettes can be perforated by means of one or more beams of coherent radiation is disclosed in numerous Letters Patent of the assignee including the aforementioned patents to Gretz et al. and Heitmann et al.

The mode of operation of the apparatus of FIGS. 1 to 6 is as follows:

The conveyor 40 deposits filter cigarettes 1 of double unit length into the front flutes 7a of successive rolling surfaces 4 ahead of the rolling station whereby the deposited articles 1 are attracted by suction in the respective ports 8 and remain in their flutes 7a during advancement with the conveyor 2 toward the rolling station. FIG. 2 shows a filter cigarette 1a of double unit length in the flute 7a of the respective surface 4a during entry into the rolling station, namely during the initial stage of engagement by the oncoming entraining member 22a at the front end of the respective rolling surface 17a. The entraining member 22a expels the article 1a from the respective flute 7a whereupon the article immediately contacted by the oncoming rolling surface 17a to be rotated about its own axis while the conveyor 2 continues to move its surfaces 4 in the direction of arrow 6, i.e., the article 1a is compelled to roll between the respective surfaces 4a and 17a whereby the front flute 7a moves away and the corresponding rear flute 7b approaches the rolling article (note FIGS. 3, 4 and 5). The article 1a rotates about its own axis without sharing the movements of the respective surfaces 4a and 17a in the directions which are indicated by the arrows 6 and 18 because the speed of the surfaces 4a and 17a is the same and because such surfaces move in opposite directions.

The laser 34 emits radiation during a portion or during the entire interval of rotation of the article 1a about its axis at the rolling station so that the wrapper of such article is provided with two or more annuli of perforations, i.e., at least one annulus of perforations for each half of the article 1a (which is thereupon severed midway between its ends to yield two filter cigarettes of unit length).

Figure 6:
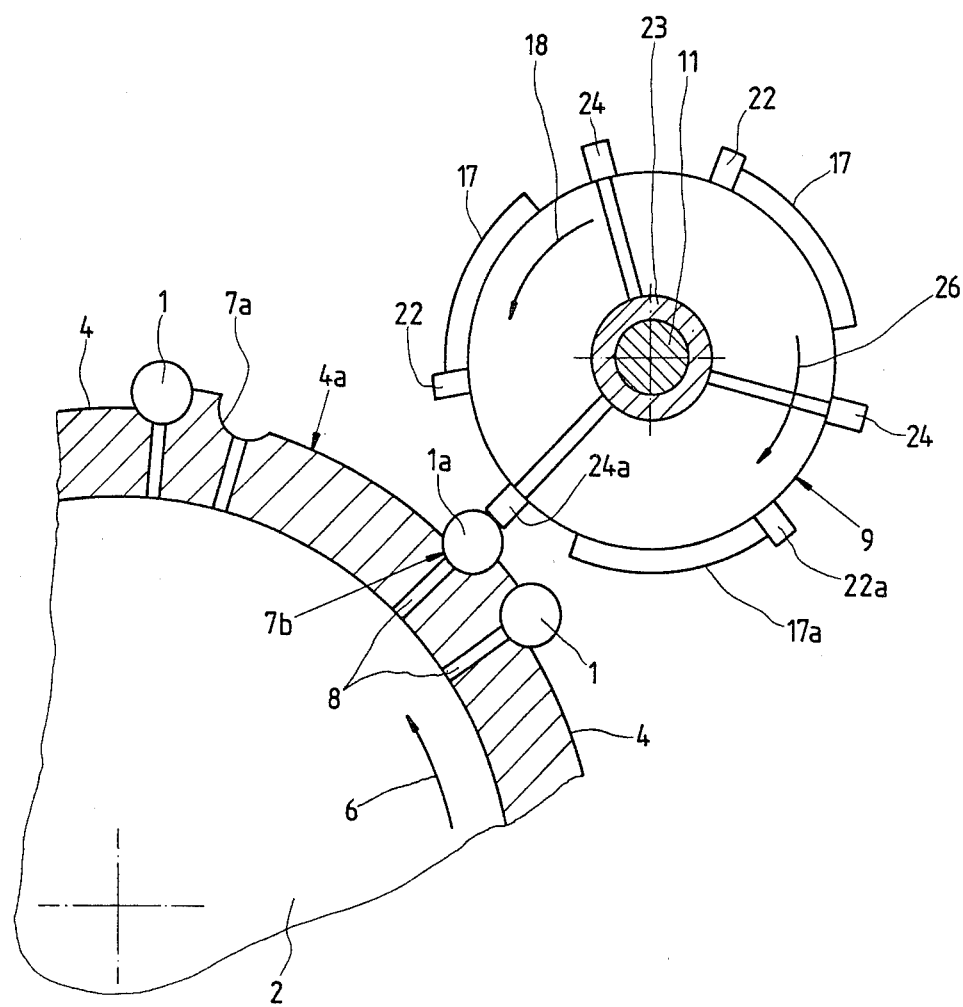
FIG. 6 shows the structure of FIG. 2 with the conveyor and the one rolling member in angular positions upon completed transfer of the one article from the front to the rear portion of the respective first surface.

When the conveyor 2 and the rolling member 9 reach the angular positions of FIG. 6, the article 1a is in register with the trailing flute 7b of the rolling surface 4a and is simultaneously engaged by the arresting member 24a on the rotor 23 which is driven in the direction of the arrow 26. The arresting member 24a prevents the article 1a from rotating about its axis by causing the article to bear against that portion of the rolling surface 4a which surrounds the flute 7b. In addition, the arresting member 24a rapidly or abruptly accelerates the article 1a in the direction of the arrow 6 so that the article 1a again advances with the conveyor 2 while being attracted by suction in the respective ports 8.

It will be noted that the arresting member 24a exerts a mechanical force upon the adjacent article 1a as soon as the article enters the respective flute 7b so that the article is abruptly held against further rotation about its own axis (i.e., the article is prevented from rolling out of the flute 7b) and the article is abruptly accelerated in the direction of arrow 6 which also contributes to reliable retention of the article in its flute 7b. This renders it possible to greatly reduce suction in the ports 8 which draw air from the flutes 7b because the suction merely serves to ensure a retention of article during travel away from the rolling station. Consequently, the conveyor 2 can be formed with relatively small and/or with a small number of suction ports 8, i.e., the rate of air flow through the ports 8 which communicate with the flutes 7b is relatively small; this is desirable and advantageous because the apparatus generates little noise in contrast with heretofore known apparatus wherein the articles are caused to terminate the rolling movement exclusively by suction which is achieved by using large suction generating devices and large-diameter suction ports which must be closed and exposed more than four thousand times per minute. This not only reduces the likelihood of predictable transport of articles from the rolling station but entails the generation of pronounced noise which affects the attendants.

The apparatus can be designed for operation with a single rolling member 9 and with two rotors 23, i.e., with n rolling members and m rotors 23 wherein n and m are whole numbers including one. The utilization of two rolling members 9 at opposite axial ends of the rotor 23 is desirable because this reduces the generation of moments acting transversely of the longitudinal direction of the articles 1 while the articles are engaged by the oncoming arresting members 24.

The drive for the rotor 23 need not necessarily derive motion from the drive for the rolling members 9. For example, the rotor 23 can receive motion directly from the prime mover of the filter tipping machine or from the drive means for the conveyor 2.

The entraining members 22 constitute desirable but optional components of the improved apparatus.

Figure 7:
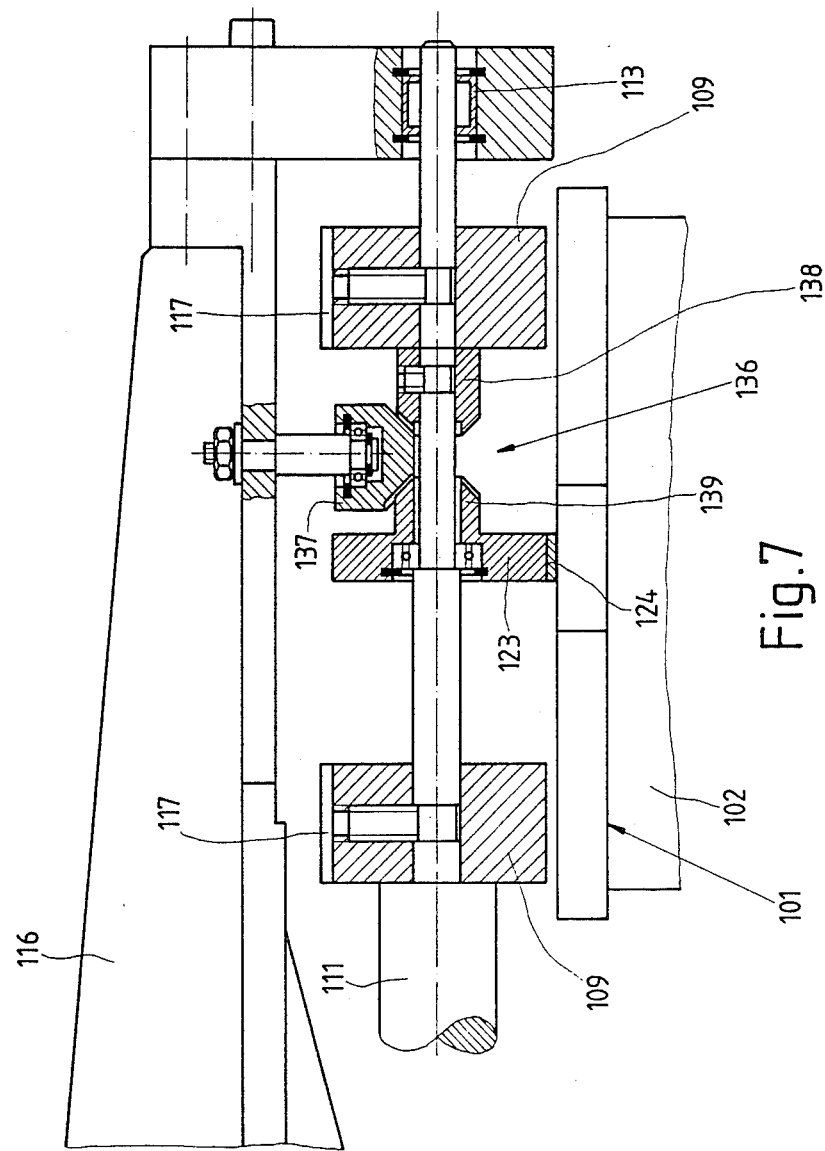
FIG. 7 is a fragmentary partly side elevational and partly sectional view of a second apparatus wherein the arresting members receive motion from the drive for the rolling members through the medium of a train of bevel gears.

FIG. 7 shows a portion of a second apparatus wherein all such parts which are identical with or clearly analogous to the corresponding parts of the apparatus of FIGS. 1–6 are denoted by similar reference characters plus 100. The main difference between the two apparatus is that the rotor 123 of the apparatus which is shown in FIG. 7 receives motion from the drive shaft 111 of the drive means for the rolling members 109 by way of a motion transmitting unit having a train 136 of bevel gears. A first bevel gear 138 is coaxial with and is rigidly secured to the shaft 111 and mates with a second bevel gear 137 mounted on the beam 116. The bevel gear 137 further mates with a bevel gear 139 which forms an integral part of or is non-rotatably affixed to the rotor 123 for the arresting members 124. The bevel gear 139 is rotatable on one or more antifriction bearings which surround the shaft 111. The train 136 ensures that the rolling members 109 and the rotor 123 for the arresting members 124 rotate in opposite directions but at the same peripheral speed.

Figure 8:
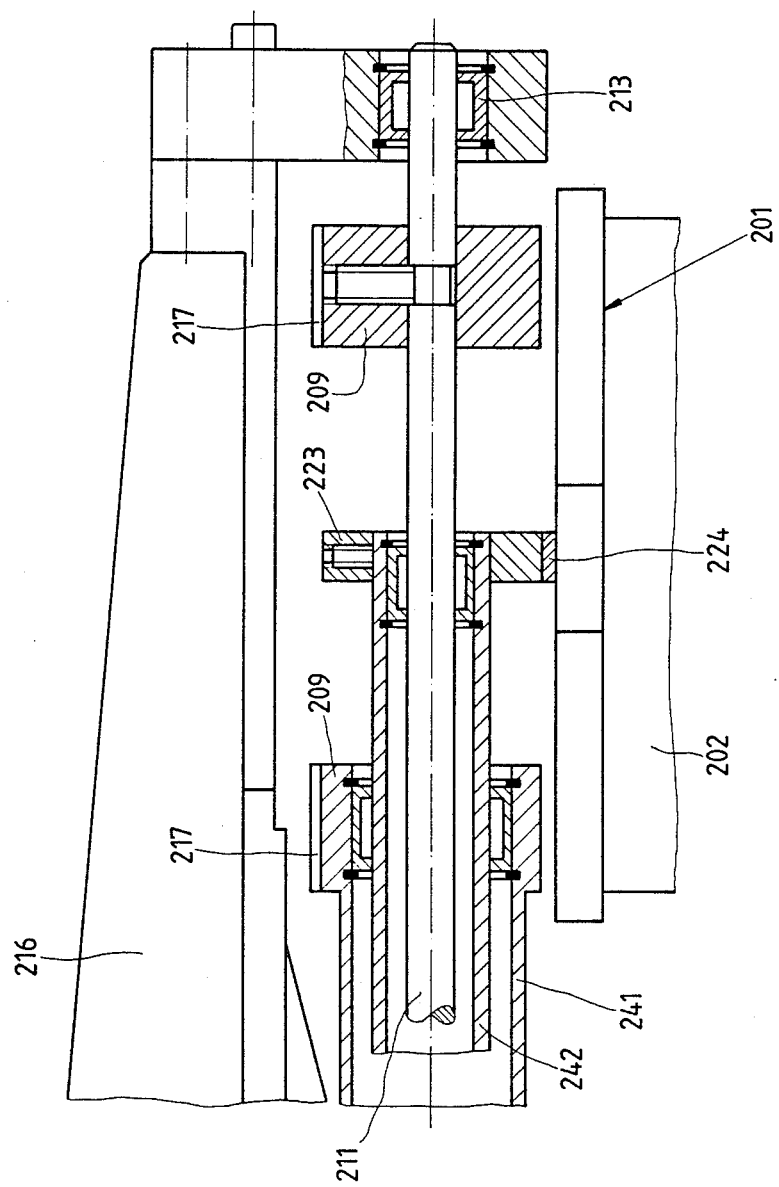
FIG. 8 is a similar fragmentary partly elevational and partly sectional view of a third apparatus wherein the shaft which drives one of the rolling members is rotatably journalled in a hollow shaft of the means for moving the arresting members.

Referring to FIG. 8, there is shown a third apparatus wherein all such parts which are identical with or clearly analogous to the corresponding parts of the apparatus of FIGS. 1–6 are denoted by similar reference characters plus 200. The drive means for one of the rolling members 209 comprises a shaft 211 which is journalled in two antifriction bearings (only the bearing 213 can be seen) and is coaxial with and is rotatable in a hollow shaft 242 of the drive means for the rotor 223 which carries the arresting members 224. The drive means for the other rolling member 209 comprises a further hollow shaft 241 which is coaxial with the shafts 211, 242 and contains one or more antifriction bearings for the hollow shaft 242. The shafts 211 and 241 are rotated in the same direction by the prime mover of the filter tipping machine, and the shaft 242 is rotated in the opposite direction. The means for rotating the drum-shaped conveyor 202 is not shown.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for manipulating rod-shaped articles of the tobacco processing industry, comprising a conveyor for moving the articles in a predetermined direction, said conveyor having a series of first rolling surfaces each including a front and a rear portion as seen in said direction; means for depositing articles on the front portions of successive surfaces so that the articles extend transversely of said direction; a rolling device including at least one rolling member having a series of second rolling surfaces: first drive means for moving said first surfaces at a predetermined speed; second drive means for moving said second surfaces at said speed counter to said direction, said rolling member being adjacent said conveyor so that the articles which advance with successive first surfaces are engaged by successive second surfaces and roll about their respective axes while the respective first surfaces move relative thereto; and means for terminating the rolling of articles when the articles are reached by the rear portions of the respective first surfaces, including a series of spaced-apart arresting members and means for moving said arresting members in said direction with and relative to said conveyor and at said speed so that successive arresting members engage successive articles on said conveyor and press the articles against the rear portions of the respective first surfaces.

2. The apparatus of claim 1, wherein the front and rear portions of said first surfaces have flutes for rod-shaped articles.

3. The apparatus of claim 2, wherein said motion transmitting means comprises a train of spur gears.

4. The apparatus of claim 2, wherein said motion transmitting means comprises a train of bevel gears.

5. The apparatus of claim 1, wherein said conveyor includes a rotary drum-shaped member having a peripheral surface including circumferentially extending sections which constitute said first surfaces.

6. The apparatus of claim 1, wherein said conveyor comprises means for attracting the articles to the front and rear portions of said first surfaces by suction.

7. The apparatus of claim 1, wherein said rolling member comprises a rotor having a peripheral surface including circumferentially extending sections which constitute said second rolling surfaces.

8. The apparatus of claim 1, wherein the means for terminating the rolling of articles includes a rotor having a peripheral surface and said arresting members include projections extending beyond said peripheral surface.

9. The apparatus of claim 6, wherein said rolling device includes two spaced-apart rolling members and said rotor is disposed between said rolling members.

10. The apparatus of claim 1, wherein each of said second surfaces has a front portion and an article entraining member in the region of such front portion.

11. The apparatus of claim 1, wherein said surfaces are convex surfaces and the curvature of said first surfaces deviates from the curvature of said second surfaces.

12. The apparatus of claim 1, wherein said conveyor comprises ribs disposed between the rear portions of said first surfaces and the front portions of neighboring first surfaces.

13. The apparatus of claim 1, wherein said rolling member includes a first rotor and said means for terminating the rolling of articles includes a second rotor which is coaxial with said first rotor.

14. The apparatus of claim 1, further comprising means for making holes in successive articles during rolling of such articles between the respective first and second surfaces.

15. The apparatus of claim 1, wherein said conveyor, said rolling member and said means for terminating the rolling of articles are rotatable about parallel axes.

16. A method of manipulating rod-shaped articles of the tobacco processing industry between a succession of first surfaces each of which has a front and rear portion and a succession of second surfaces, comprising the steps of advancing the first surfaces in a predetermined direction and at a predetermined speed along a first path wherein the front portions of the first surfaces are located ahead of the respective rear portions; depositing articles on the front portions of successive first surfaces so that the articles extend transversely of said direction; advancing the second surfaces at said speed in a second direction counter to said predetermined direction along a second path a portion of which is sufficiently close to the first path to move the second surfaces into contact with the oncoming articles so that successive articles are compelled to rotate about their respective axes and the first surfaces advance in said predetermined direction relative to the respective articles; and terminating the rotation of articles about their axes when such articles are contacted by the rear portions of the respective first surfaces, including mechanically pressing the articles against the rear portions of the respective first surfaces in a direction from said portion of the second path toward the first path.

17. Apparatus for manipulating rod-shaped articles of the tobacco processing industry, comprising a conveyor for moving the articles in a predetermined direction, said conveyor having a series of first rolling surfaces each including a front and a rear portion as seen in said direction; means for depositing articles on the front portions of successive surfaces so that the articles extend transversely of said direction; a rolling device including at least one rolling member having a series of second rolling surfaces; first drive means for moving said first surfaces at a predetermined speed; second drive means for moving said second surfaces at said speed counter to said direction, said second drive means comprising a shaft and said rolling member being adjacent said conveyor so that the articles which advance with successive first surfaces are engaged by successive second surfaces and roll about their respective axes while the respective first surfaces move relative thereto; and means for terminating the rolling of articles when the articles are reached by the rear portions of the respective first surfaces, said terminating means being rotatably mounted on said shaft and including a series of spaced-apart arresting members and means for moving said arresting members in said direction and at said speed so that successive arresting members engage successive articles on said conveyor and press the articles against the rear portions of the respective first surfaces.

18. Apparatus for manipulating rod-shaped articles of the tobacco processing industry, comprising a conveyor for moving the articles in a predetermined direction, said conveyor having a series of first rolling surfaces each including a front and a rear portion as seen in said direction; means for depositing articles on the front portions of successive surfaces so that the articles extend transversely of said direction; a rolling device including at least one rolling member having a series of second rolling surfaces; first drive means for moving said first surfaces at a predetermined speed; second drive means for moving said second surfaces at said speed counter to said direction, said rolling member being adjacent said conveyor so that the articles which advance with successive first surfaces are engaged by successive second surfaces and roll about their respective axes while the respective first surfaces move relative thereto; means for terminating the rolling of articles when the articles are reached by the rear portions of the respective first surfaces, including a series of spaced-apart arresting members and means for moving said arresting members in said direction and at said speed so that successive arresting members engage successive articles on said conveyor and press the articles against the rear portions of the respective first surfaces; and means for transmitting motion from said second drive means to the means for moving said arresting members.

19. Apparatus for manipulating rod-shaped articles of the tobacco processing industry, comprising a conveyor for moving the articles in a predetermined direction, said conveyor having a series of first rolling surfaces each including a front and a rear portion as seen in said direction; means for depositing articles on the front portions of successive surfaces so that the articles extend transversely of said direction; a rolling device including at least one rolling member having a series of second rolling surfaces; first drive means for moving said first surfaces at a predetermined speed; second drive means for moving said second surfaces at said speed counter to said direction, said second drive means comprising at least one first shaft and said rolling member being adjacent said conveyor so that the articles which advance with successive first surfaces are engaged by successive second surfaces and roll about their respective axes while the respective first surfaces move relative thereto; and means for terminating the rolling of articles when the articles are reached by the rear portions of the respective first surfaces, including a series of spaced-apart arresting members and means for moving said arresting members in said direction and at said speed so that successive arresting members engage successive articles on said conveyor and press the articles against the rear portions of the respective first surfaces, said means for moving the arresting members comprising a second shaft which is coaxial with said first shaft, one of said shafts being hollow and the other of said shafts being installed in said hollow shaft.

20. Apparatus for manipulating rod-shaped articles of the tobacco processing industry, comprising a conveyor for moving the articles in a predetermined direction, said conveyor having a series of first rolling surfaces each including a front and a rear portion as seen in said direction; means for depositing articles on the front portions of successive surfaces so that the articles extend transversely of said direction; a rolling device including at least one rolling member having a series of second rolling surfaces; first drive means for moving said first surfaces at a predetermined speed; second drive means for moving said second surfaces at said speed counter to said direction, said rolling member being adjacent said conveyor so that the articles which advance with successive first surfaces are engaged by successive second surfaces and roll about their respective axes while the respective first surfaces move relative thereto, said rolling member including means for expelling articles from the front portions of oncoming first surfaces immediately prior to engagement of such articles by the respective second surfaces; and means for terminating the rolling of articles when the articles are reached by the rear portions of the respective first surfaces, including a series of spaced-apart arresting members and means for moving said arresting members in said direction and at said speed so that successive arresting members engage successive articles on said conveyor and press the articles against the rear portions of the respective first surfaces.

* * * * *